May 8, 1962 P. GEISERT 3,033,262
ANTISKID DEVICE
Filed Aug. 18, 1960 3 Sheets-Sheet 2
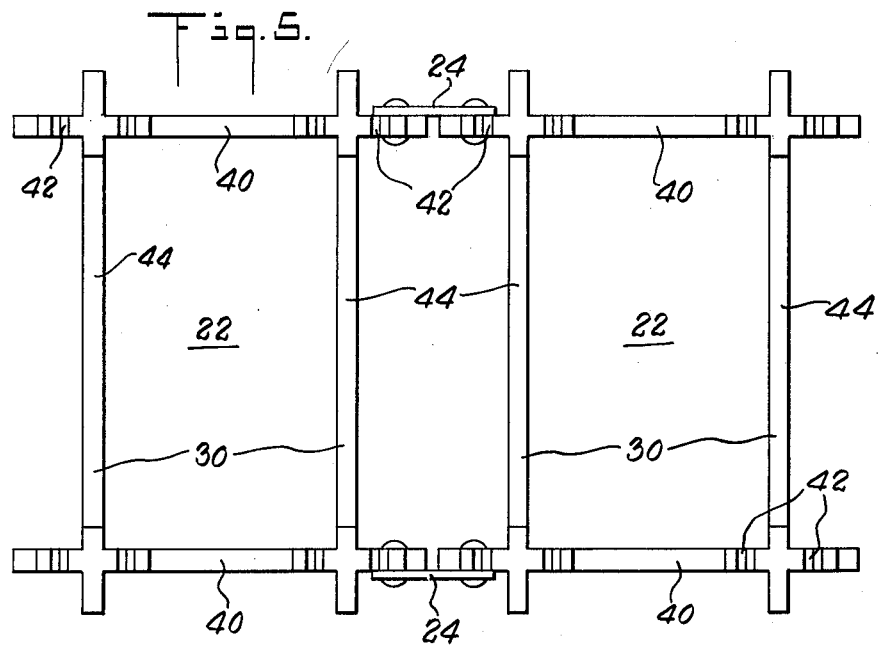
Fig. 5.
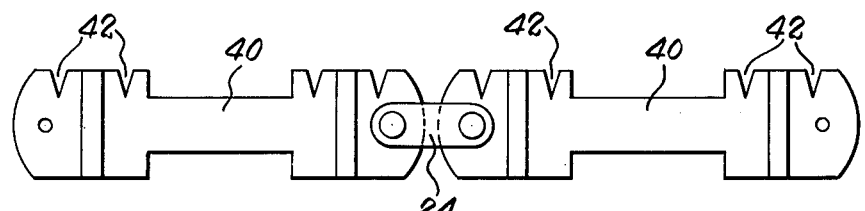
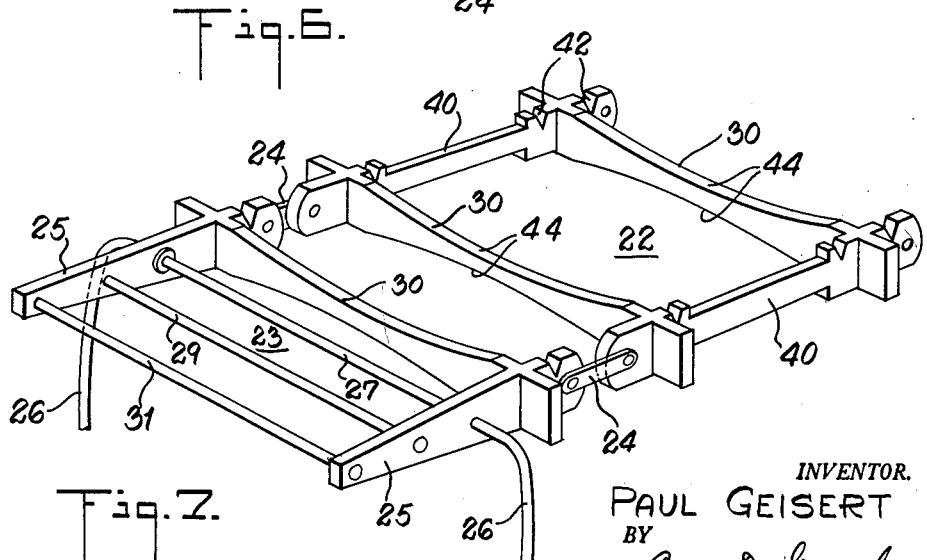
Fig. 6.
Fig. 7.
INVENTOR.
PAUL GEISERT
BY
Cyrus D. Samuelson
ATTORNEY

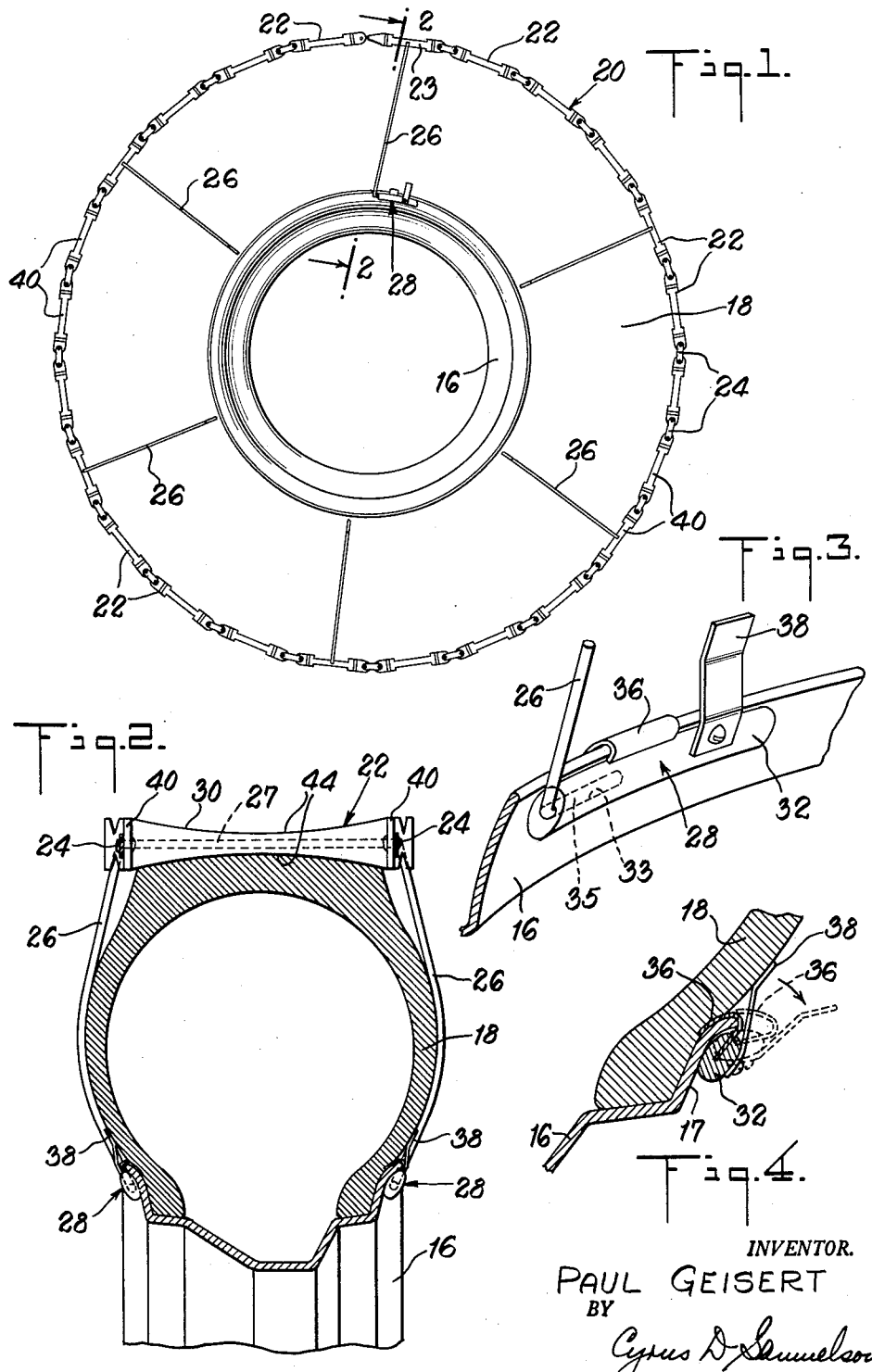

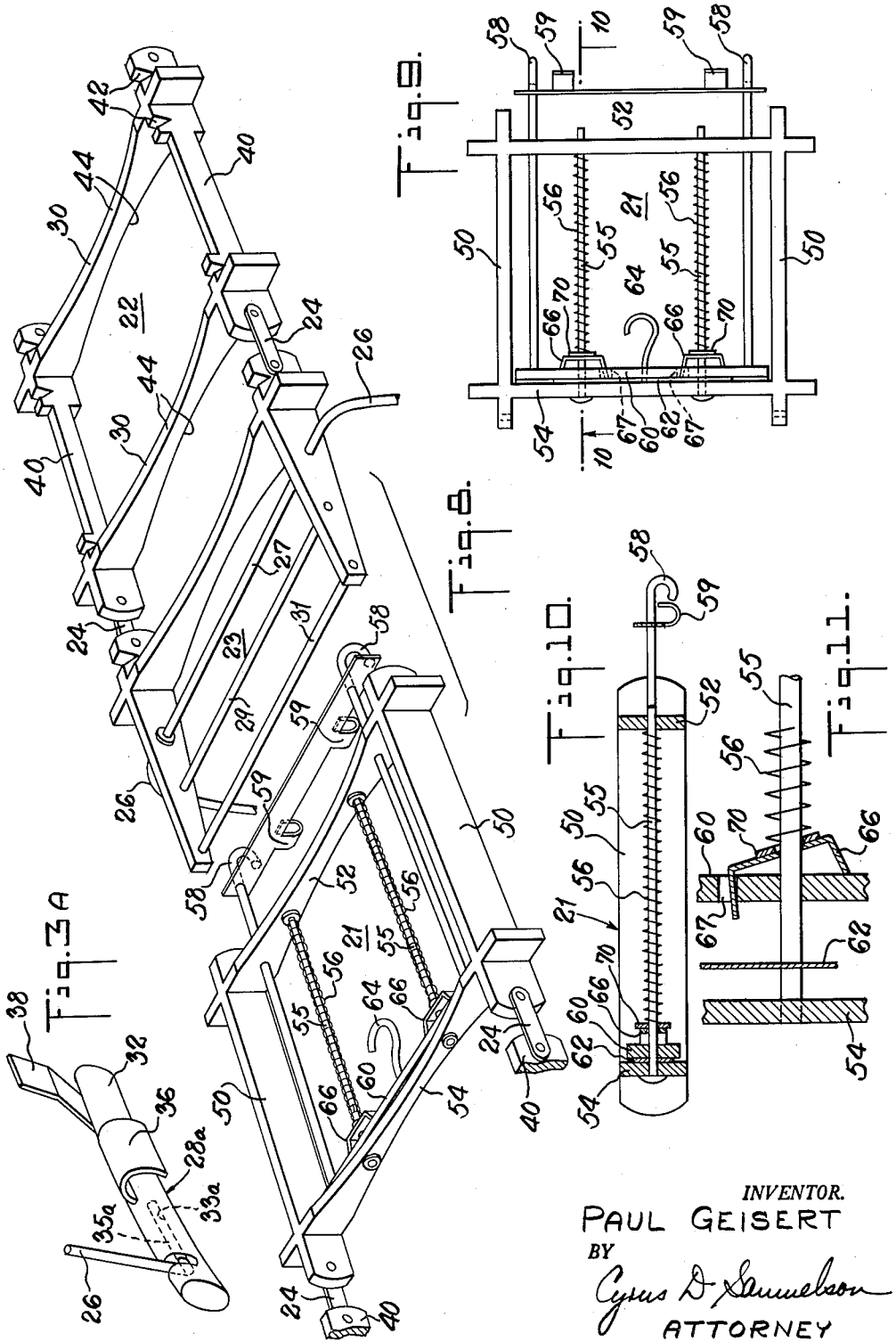

United States Patent Office 3,033,262
Patented May 8, 1962

3,033,262
ANTISKID DEVICE
Paul Geisert, 1098 Korfitsen Road, New Milford, N.J.
Filed Aug. 18, 1960, Ser. No. 50,447
15 Claims. (Cl. 152—219)

My invention relates to antiskid devices and in particular to those antiskid devices which may be applied to and removed from vehicle tires quickly and easily.

In the prior art, there have been many antiskid devices which were designed to be applied to vehicle tires. All of these prior art devices had one serious disadvantage in common, namely, they were difficult to put on the tire quickly and conveniently. Because of the difficulty encountered in applying these prior art antiskid devices to the tire, many drivers preferred to drive without them rather than go to the trouble of installing them on the rear tires of the vehicle. As a consequence, many automobiles are often immobilized during snowy and slippery weather. Most exasperating from the viewpoint of the driver who does take the time and effort to install these prior art antiskid devices on his vehicle is the fact that he may still be immobilized on the road because some of the vehicles in front of him are not equipped with antiskid devices. The prior art antiskid devices are commonly referred to as tire chains.

Some of the prior art devices possess other inherent disadvantages which are overcome by devices produced in accordance with the teachings of my invention. Some of these disadvantages are: slipping of the device off the tire tread; uneven traction because of the design of the crossties; and inadequate traction on ice and/or snow.

It is an important object of my invention to provide an antiskid device which is easy to apply to and remove from a vehicle tire.

It is a further object of my invention to provide such an antiskid device which remains firmly affixed in position on the vehicle tire to which it is applied.

It is a still further object of my invention to provide such an antiskid device which will not become slack on the wheel.

It is a still further object of my invention to provide such an antiskid device which is reversible and may be used in both ice and snow.

These and other objects, features, uses and advantages will be apparent during the course of the following description when taken in conjunction with the accompanying drawings wherein:

FIGURE 1 is an elevational view of a preferred embodiment of my invention applied to a vehicle wheel which is equipped with an inflatable rubber tire, FIGURE 2 is a cross-sectional view along the line 2—2 of FIGURE 1, viewed in the direction of the arrows, FIGURE 3 is a view, in perspective, of the clip which is installed between the tire and the wheel rim, FIGURE 3A is a perspective view of a modified form of clip showing the opposite side from that shown in FIGURE 3, in which embodiment the gripper hook is held captive in the opening in the clip, FIGURE 4 is a view, in cross-section, showing the manner in which the clip of FIGURE 3 is installed and removed from the wheel, FIGURE 5 is a plan view of a pair of crossties used in carrying out the teachings of my invention, FIGURE 6 is an elevational view of the crossties of FIGURE 5, FIGURE 7 is a view, in perspective, of one end of the antiskid device of my invention, FIGURE 8 is a view, in perspective, of both ends of the antiskid device of my invention, showing the manner in which the ends are joined to form a single circumferential unit, FIGURE 9 is a plan view of the closing end section of FIGURE 8, FIGURE 10 is an enlarged cross-sectional view along the lines 10—10 of FIGURE 9, and FIGURE 11 is an enlarged view, in cross-section, showing the U-shaped locking element in the locked position.

In the drawings, wherein, for the purpose of illustration, is shown a preferred embodiment of antiskid device of my invention, the numeral 20 designates the antiskid device generally. Device 20 is mounted on tire 18 which, in turn, is mounted on wheel 16. Antiskid device 20 is held in position on tire 18 by means of grippers 26. At least one pair of grippers 26 are provided with hooks 35 which are inserted into opening 33 as will be described, in detail later in this description.

Antiskid device 20 is formed into a single integral length made up of a plurality of crossties 22, an end crosstie 23 and a closing section end crosstie 21. When crossties 21 and 23 are joined together, the antiskid device forms a circumferential unit which fits the tire. Antiskid device 20 is held in position on tire 18 by means of a plurality of grippers 26 which are preferably U-shaped in form and are fashioned to spring against the sidewall of the tire and to maintain firm contact with the vehicle tire. The grippers may be formed from a single piece of material with two sides 26 and a base 27 (FIGURE 2) or they may be formed of separate side pieces which are affixed to the crossties. I prefer to form the grippers as shown but the other units are equally satisfactory.

Clip 28 comprises body member 32, clamp 36 and handle 38. Body member 32 is formed in the shape of a loop to provide opening 33. Clip 28 is installed on tire 18 and locked in position between tire 18 and wheel rim 17 (part of wheel 16) as shown in FIGURE 4. It is shown installed in solid lines and being removed in dotted lines. After it is installed by inserting clamp 36 between rim 17 and tire 18, hook 35 is inserted in opening 33 which is formed by the loop in body member 32. There are two clips 28 mounted as described above, one on the inside of the wheel and one on the outside of the wheel. After the antiskid device has been removed from the tire, the clips may be removed by grasping handle 38 and moving it outward in the direction of the arrow of FIGURE 4 and releasing the clip from between the tire and rim or the clips may be left in place on the wheel.

Clip 28a of FIGURE 3A is held captive on hook 35a as shown in the figure. Clip 28a comprises body member 32, handle 38 and clip 36. Body member 32 is looped to provide opening 33a and is slotted as shown in the figure so that clip 28a remains a part of and attached to antiskid device 20. The installation of antiskid devices of my invention having the modified clip 28a will be described below.

Crossties 22 comprise longitudinal members 40 between which are affixed lateral members 30. Crossties 22 may be formed with single lateral members 30 midway along longitudinal members 40, if desired. Longitudinal members 40 are notched as shown at 42 in FIGURE 6 to give the device more gripping action on ice and snow. The underside of longitudinal members 40 of FIGURE 6 may also be notched so that the device will be completely reversible. Lateral members 30 are cured on both edges as shown at 44 in FIGURE 7 to enable the device to be in closer contact with the tire and to render the device reversible. Crossties 22 are joined articulatedly by means of bar 24 and the bolts as shown in FIGURE 5 and 6. If desired, the joined ends of the crossties may be offset so as to mesh together instead of being joined as shown in the drawings:

In FIGURE 7, there is shown a crosstie 22 joined to end crosstie 23. End crosstie 23 comprises a pair of longitudinal members 25, lateral member 30 and lateral rods 29 and 31. It is also seen that base 27 of the gripper is held in position in crosstie 23. The purpose and use of rods 29 and 31 will be apparent as this description proceeds. Other grippers may be installed in selected crossties 22 as desired in the same manner in which the gripper is installed in crosstie 23. I prefer to form end crosstie 23 in the wedge shape shown in FIGURE 8 but the wedge shape is not essential to the operation of antiskid devices of my invention. The wedge facilitates installation since it is easier for the tire to run onto the crosstie but it is also possible for the tire to run onto an end crosstie which is not wedge-shaped.

In FIGURE 8, there is illustrated an exploded view of crossties 21 and 23 to show the manner in which the elements are joined in order to close the loop and form a circumferential unit of the antiskid device. Crosstie 21 comprises longitudinal members 50 between which are affixed lateral members 52 and 54. Rods 55 are mounted between lateral members 52 and 54 and are affixed thereto. Springs 56 are wound around rods 55 and are compressed when movable lateral member 60 is moved toward lateral member 52. U-shaped locks 66 are mounted on rods 55 between the springs 56 and movable lateral member 60 and are acted upon by springs 56 so as to force one side of the U into opening 67 in member 60. Hooks 58 are affixed to movable member 60 and are fed through lateral member 52 and are movable with respect thereto. Hooks 58 are intended to engage rods 27, 29 or 31 depending on the circumference of the tire to which the device is affixed. Hook member 59 also hooks over the rod on which hooks 58 are hooked.

FIGURES 9, 10 and 11 illustrate the various features of crosstie 21 which make antiskid devices of my invention more universally adaptable to tires of various sizes than those of the prior art. When springs 56 are compressed and hooks 58 have been attached to the appropriate rod of crosstie 23, the pressure on the springs is removed and the expansion of the springs moves movable member 60 back and tightens the connection between crossties 21 and 23. The expansion of springs 56 pushes U-shaped locks 66 so that one side of each of them fits into an opening 67 in member 60. When the U-shaped locks are in this position, member 60 cannot be pushed toward member 52 so as to compress the springs and loosen the hooks from the rod. Thus, by using the U-shaped locks, it is only possible for the springs to expand and further tighten the connection. They will not compress and thereby loosen the hooks from the rod. As a result of this action the antiskid device always fits tightly around the tire to which it is applied.

Installation of antiskid devices of my invention is accomplished in the following manner. A clip 28 is installed on each side of the wheel at the starting point. Crosstie end section 23 is placed on the wheel so that gripper sides 26 may be hooked into clips 28 by placing hook 35 in opening 33. Now the wheel is rotated forward and the crossties are placed on the outside of the tire. Grippers 26, which are mounted at spaced points along the unit, are placed in position on the tire as they move into place on the tire. These secondary grippers may be used with or without clips and I prefer to use the clips only in conjunction with the grippers on the first crosstie 23. After crosstie 21 has been pulled into place on the tire, springs 56 are compressed by pulling on hook 64 which is attached to plate 62. Plate 62 pushes U-shaped locks 66 out of openings 67 so that the springs may be compressed. Now, hooks 58 and 59 are placed on the appropriate rod on crosstie 23 and hook 64 is released. Springs 56 expand until they can no longer overcome the pull of hooks 58 on the rod and the device is tightly installed on the tire.

When devices of my invention equipped with clips 28a are used, the installation procedure is as follows: end crosstie 23 is placed on the tire, grippers 26 associated with end crosstie 23 are placed against the tire wall, clips 28a are inserted between the wheel rim and the tire and locked in place in the same manner as is used in installing clips 28. The installation then proceeds as described above in connection with the installation of devices of my invention in which the clips are not held captive on the grippers.

To remove the device from the tire, springs 56 are compressed by pulling hook 64 so that plate 62 acts on U-shaped locks 66 as described above. Then hooks 58 are removed from the rod of crosstie 23 and the unit is removed from the wheel in the opposite manner from which it was installed.

I prefer to use washer 70 between U-shaped lock 66 and spring 56 so that more even pressure is obtained between the two elements but this is not essential. I can also fashion the U-shaped locks so that they have a flat surface which makes contact with the springs.

It can easily be seen that antiskid devices of my invention may readily be used with tires of different sizes without having to remove or add links or buy new chains every time one purchases a vehicle in which the tire sizes are different from those of the previously owned vehicle. It also permits owners of more than one automobile to use the same set of antiskid devices on both vehicles.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. In an antiskid device for installation on a vehicle tire mounted on a wheel in which said antiskid device comprises a plurality of crossties connected together to form a single length, a plurality of clamps affixed to said antiskid device and gripping the vehicle tire the improvement which comprises a plurality of crossties, means for joining adjacent crossties, at least one U-shaped gripper affixed to one of said crossties and laying along each sidewall of the tire, a clip mounted between the tire and the rim of the wheel and held thereby, a hook on the end of said U-shaped gripper cooperatively engaged in said clip, and one spring-biased crosstie, said spring-biased crosstie being placed at one end of said single length so as to form a circumferential integral unit of said antiskid device and take up the slack therein, said spring-biased crosstie comprising a pair of longitudinal members, a pair of lateral members joined to said longitudinal members, said lateral members being of such size and shape as to fit over said vehicle tire, at least one rod held in fixed position between said pair of lateral members, a movable lateral element mounted adjacent one of said lateral members and between said lateral members carrying an opening therein through which said rod is fed, a spring around said rod, a hook member projecting through one of said lateral members and affixed to said movable lateral element, locking means actuated by said spring adjacent said movable lateral element, and means affixed to said movable lateral element for compressing said spring and moving said hook member.

2. An antiskid device as described in claim 1 wherein said locking means comprises a U-shaped member mounted around said rod between said spring and said movable lateral member and said movable lateral element carries an opening therein to receive one end of said U-shaped member, and wherein said means for compressing said spring comprises a plate mounted behind said movable lateral element and means for pushing said plate against the end of said U-shaped member within said opening.

3. An antiskid device as described in claim 2 wherein there are two rods, two springs, one around each rod, and two U-shaped members, one on each rod.

4. An antiskid device as described in claim 1 wherein there are two rods, two springs, one around each rod, and two U-shaped members, one on each rod.

5. An antiskid device for a vehicle tire mounted on a wheel comprising a plurality of articulatedly joined crossties forming a single length, at least one U-shaped gripper affixed to one of said crossties, a hook at each end of said U-shaped gripper, a pair of clips mounted between the rim of the wheel and the tire on opposite sides thereof, said clip comprising a looped body member, said clip being placed such that said hook is cooperatively engaged in said looped body member, a spring-biased crosstie at one end of said single length, means affixed to said spring-biased crosstie and to the crosstie at the other end of said single length for joining the two ends of said single length so as to form a single circumferential integral unit and to take up the slack therein, said spring-biased crosstie comprising a pair of longitudinal members, a pair of lateral members joined to said longitudinal members, said lateral members being of such size and shape as to fit over said vehicle tire, at least one rod held in fixed position between said pair of lateral members, a movable lateral element mounted adjacent one of said lateral members and between said lateral members carrying an opening therein through which said rod is fed, a spring around said rod, a hook member projecting through one of said lateral members and affixed to said movable lateral element, locking means actuated by said spring adjacent said movable lateral element, and means affixed to said movable lateral element for compressing said spring and moving said hook member.

6. An antiskid device as described in claim 5 wherein said locking means comprises a U-shaped member mounted around said rod between said spring and said movable lateral member and said movable lateral element carries an opening therein to receive one end of said U-shaped member, and wherein said means for compressing said spring comprises a plate mounted behind said movable lateral element and means for pushing said plate against the end of said U-shaped member within said opening.

7. An antiskid device as described in claim 6 wherein there are two rods, two springs, one around each rod, and two U-shaped members, one on each rod.

8. An antiskid device as described in claim 5 wherein there are two rods, two springs, one around each rod, and two U-shaped members, one on each rod.

9. An end section for an antiskid device for a vehicle tire wherein said antiskid device comprises a plurality of crossties comprising a pair of longitudinal members, a pair of lateral members joined to said longitudinal members, said lateral members being of such size and shape so as to fit over the tread of the vehicle tire, at least one rod held in fixed position between said pair of lateral members, a movable lateral element mounted adjacent one of said lateral members and between said lateral members carrying an opening therein through which said rod is fed, a spring around said rod, a hook member projecting through one of said lateral members and affixed to said movable lateral element, locking means actuated by said spring adjacent said movable lateral element, and means affixed to said movable lateral element for compressing said spring and moving said hook member.

10. An end section as described in claim 9 wherein said locking means comprises a U-shaped member mounted around said rod between said spring and said movable lateral member and said movable lateral element carries an opening therein to receive one end of said U-shaped member, and wherein said means for compressing said spring comprises a plate mounted behind said movable lateral element and means for pushing said plate against the end of said U-shaped member within said opening.

11. An end section as described in claim 10 wherein there are two rods, two springs, one around each rod, and two U-shaped members, one on each rod.

12. An end section as described in claim 9 wherein there are two rods, two springs, one around each rod, and two U-shaped members, one on each rod.

13. A reversible crosstie for an antiskid device for a vehicle tire comprising a pair of longitudinal members spaced so as to lie along the outer edges of the tire tread, and a pair of spaced lateral members connected between said longitudinal members so as to overlay the tire tread, two opposite edges of each of said lateral members being arcuately shaped such that one of said edges contacts the tire tread along substantially all of the width of said tire tread when the crosstie is applied to said tire tread and such that the opposite of said edges contacts the tire tread along substantially all of the width of said tire tread when the crosstie is reversibly applied to said tire tread.

14. A reversible antiskid device for a vehicle tire comprising a plurality of spaced lateral members, said lateral members having arcuately shaped opposite edges such that one of said arcuately shaped edges contacts the tire tread along substantially all of the width of said tire tread when the crosstie is applied to said tire tread and such that the opposite of said arcuately shaped edges contacts the tire tread along substantially all of the width of said tire tread when the crosstie is reversibly applied to said tire tread; at least one longitudinal member cooperatively engaging said spaced lateral crossties; and means for taking up the slack in said antiskid device when the same is placed on the vehicle tire so as to form a circumferential integral unit.

15. An end section for an antiskid device for a vehicle tire wherein said antiskid device comprises a plurality of crossties comprising a pair of longitudinal members, a pair of fixed lateral members joined to said longitudinal members, said lateral members being of such size and shape as to fit over the tread of the vehicle tire, a pair of spring-biased rods mounted between said pair of fixed lateral members, a movable lateral element adjacent one of said pair of fixed lateral members affixed to said pair of spring biased rods, and locking means actuated by said movable lateral element, said fixed lateral members having their opposite edges shaped such that said end section is reversible.

References Cited in the file of this patent

UNITED STATES PATENTS

| | | |
|---|---|---|
| 1,185,084 | Gahan | May 30, 1916 |
| 1,837,708 | Frank | Dec. 22, 1931 |
| 2,425,644 | Rutledge | Aug. 12, 1947 |
| 2,536,554 | Larsen | Jan. 2, 1951 |
| 2,552,168 | Goolsby | May 8, 1951 |
| 2,882,949 | Del Vecchio | Apr. 21, 1959 |
| 2,936,807 | Hajart | May 17, 1960 |